United States Patent
Dayan et al.

(10) Patent No.: US 10,628,475 B2
(45) Date of Patent: Apr. 21, 2020

(54) RUNTIME CONTROL OF AUTOMATION ACCURACY USING ADJUSTABLE THRESHOLDS

(71) Applicant: International Business Machines Corporation, Armonk, NY (US)

(72) Inventors: Yigal S. Dayan, Jerusalem (IL); Josemina Magdalen, Jerusalem (IL); Irit Maharian, Tzur Hadasa (IL); Oren Paikowsky, Jerusalem (IL)

(73) Assignee: International Business Machines Corporation, Armonk, NY (US)

( * ) Notice: Subject to any disclaimer, the term of this patent is extended or adjusted under 35 U.S.C. 154(b) by 378 days.

(21) Appl. No.: 15/723,400

(22) Filed: Oct. 3, 2017

(65) Prior Publication Data
US 2019/0102452 A1    Apr. 4, 2019

(51) Int. Cl.
*G06F 17/30* (2006.01)
*G06F 16/35* (2019.01)
(Continued)

(52) U.S. Cl.
CPC ............ *G06F 16/35* (2019.01); *G06F 16/258* (2019.01); *G06F 16/285* (2019.01);
(Continued)

(58) Field of Classification Search
CPC ...... G06F 16/35; G06F 16/285; G06F 16/906; G06F 16/93; G06F 16/258; G06F 16/683; G06N 20/00
See application file for complete search history.

(56) References Cited

U.S. PATENT DOCUMENTS 7,756,874 B2   7/2010   Hoekman et al.
9,256,836 B2   2/2016   Ludlow et al.
(Continued)

FOREIGN PATENT DOCUMENTS

WO    2016090197 A1    6/2016

OTHER PUBLICATIONS

Cong et al., "Semi-supervised Text Classification Using Partitioned EM," Database Systems for Advanced Applications, DASFAA 2004, Lecture Notes in Computer Science, vol. 2973, 2004, pp. 482-493, see pp. 482-483.

*Primary Examiner* — Jared M Bibbee
(74) *Attorney, Agent, or Firm* — Winstead PC (57) ABSTRACT

A computer-implemented method, system and computer program product for maintaining a target accuracy level. A target accuracy level is received. Thresholds including ongoing adjustable automation thresholds for categories are computed based on the target accuracy level. Data is received and a classification score for the categories is generated with respect to the data based on a category knowledgebase. Furthermore, a classification score is detected for a category with a higher classification score than other categories of the plurality of categories that exceeds an ongoing adjustable automation threshold. A reply to the data is automatically sent out based on the category with the higher classification score. The action, the suggestion list, and corresponding received feedback are monitored to generate a historical performance dataset. An actual accuracy level is then determined based on the historical performance dataset. The ongoing adjustable automation threshold is then adjusted based on the actual accuracy level.

20 Claims, 6 Drawing Sheets

(51) Int. Cl.
  *G06N 20/00*  (2019.01)
  *G06F 16/93*  (2019.01)
  *G06F 16/25*  (2019.01)
  *G06F 16/28*  (2019.01)
  *G06F 16/906* (2019.01)
  *G06F 16/683* (2019.01)
(52) U.S. Cl.
  CPC ............ G06F 16/906 (2019.01); G06F 16/93 (2019.01); G06N 20/00 (2019.01); *G06F 16/683* (2019.01)

(56) References Cited

U.S. PATENT DOCUMENTS

| | | | |
|---|---|---|---|
| 10,402,691 B1 * | 9/2019 | Abdi Taghi Abad | G06K 9/6267 |
| 2008/0103996 A1 * | 5/2008 | Forman | G06N 20/00 706/12 |
| 2010/0293117 A1 * | 11/2010 | Xu | G06N 20/00 706/12 |
| 2012/0310864 A1 * | 12/2012 | Chakraborty | G06N 20/00 706/12 |
| 2015/0120639 A1 * | 4/2015 | Shin | G06N 20/00 706/52 |
| 2016/0171079 A1 | 6/2016 | Lunde | |
| 2016/0323281 A1 | 11/2016 | Griesmeyer | |

* cited by examiner

RUNTIME CONTROL OF AUTOMATION ACCURACY USING ADJUSTABLE THRESHOLDS

BACKGROUND

The present invention relates to the accuracy of a content classification system, and more particularly to runtime control of automation accuracy of a system.

SUMMARY

In one embodiment of the present invention, a computer-implemented method for maintaining a target accuracy level comprises receiving the target accuracy level. The computer-implemented method further comprises computing one or more thresholds comprising an ongoing adjustable automation threshold for a plurality of categories based on the target accuracy level. The computer-implemented method additionally comprises receiving data and generating a classification score for the plurality of categories with respect to the data based on a category knowledgebase. Furthermore, the computer-implemented method comprises detecting that a classification score for a category with a higher classification score than other categories of the plurality of categories exceeds the ongoing adjustable automation threshold. Additionally, the computer-implemented method comprises automatically performing an action in response to the data based on the category with a higher classification score than the other categories of the plurality of categories. In addition, the computer-implemented method comprises generating a suggestion list based on categories with higher classification scores than other categories for selection and feedback. The method further comprises monitoring outgoing actions including the action, the suggestion list, and corresponding received feedback to generate a historical performance dataset. The method additionally comprises determining an actual accuracy level based on the historical performance dataset. Furthermore, the method comprises adjusting, by a processor, the ongoing adjustable automation threshold based on the actual accuracy level.

Other forms of the embodiment of the method described above are in a system and in a computer program product.

The foregoing has outlined rather generally the features and technical advantages of one or more embodiments of the present invention in order that the detailed description of the present invention that follows may be better understood. Additional features and advantages of the present invention will be described hereinafter which may form the subject of the claims of the present invention.

BRIEF DESCRIPTION OF THE DRAWINGS

A better understanding of the present invention can be obtained when the following detailed description is considered in conjunction with the following drawings, in which.

DETAILED DESCRIPTION

Supervised learning systems usually have a preparatory training phase before deployment. However, label data might not be always available upfront. Moreover, data labeling may be labor intensive. Since the quality of the training set is extremely important for maintaining good automatic classification accuracy, it is important to have good manually labeled data.

In addition, automation systems may have a preset automation threshold in which responses to received data may be automated above a detected threshold based on a set level of accuracy. However, the threshold may be set too high and therefore result in a reduced amount of responses that are automated.

According to embodiments of the present disclosure, a system with a processor can maintain ongoing adjustable automation thresholds based on a target accuracy level. For example, the processor can receive a target accuracy level. As used herein, a target accuracy level refers to a target percentage of correct actions of a total number of automated actions. For example, the target accuracy level may be received in the form of a level of confidence. The processor can then compute ongoing adjustable automation thresholds for a plurality of categories based on the target accuracy level. The processor can also receive data and generate a classification score for the plurality of categories for the data based on a category knowledgebase. The processor can detect that a classification score for a category with a higher classification score than other categories of the plurality of categories exceeds an ongoing adjustable automation threshold. The processor can then automatically perform an action in response to the data based on the category with the higher classification score than the other categories of the plurality of categories. The processor can also generate a suggestion list based on categories with higher classification scores than other categories for selection and feedback. The processor can further monitor the action, the suggestion list, and corresponding received feedback to generate a historical performance dataset. The processor can then determine an actual accuracy level based on the historical performance dataset. The processor can adjust the ongoing adjustable automation threshold based on the actual accuracy level.

Embodiments of the present disclosure enable monitoring of the changing performance and accuracy of a system providing an automated service to make sure the system meets user expectations of accuracy, while providing increased efficiency. Using the techniques described herein, one or more ongoing adjustable automation thresholds can be adjusted based on one or more target accuracy levels. As used herein, an ongoing adjustable automation threshold is a threshold classification score or confidence level used to send automated replies based on associated classified data associated with a category that is dynamically adjustable based on a target accuracy level. For example, each category of data may be associated with a different ongoing adjustable automation threshold. In addition, one or more suggestion thresholds can be used to provide lists of suggested actions to agents for selection and feedback. Moreover, the techniques described herein may be implemented without additional human intervention. For example, the techniques may continuously monitor the system and automatically enable or disable automation based on an actual accuracy of the system as calculated using historical performance. The present techniques described herein may be used without a preparatory training phase including a dataset of manually labeled data of high quality. Thus, the techniques described herein enable an automated system to work with zero upfront training. Moreover, the techniques described herein can address situations where erroneous feedback is provided. For example, if the system detects accuracy is decreasing, then the system can automatically turn off automated classification suggestions or other automated actions.

In some scenarios, the techniques described herein may be implemented in a cloud computing environment. As discussed in more detail below in reference to at least FIGS. 3-5, a computing device configured to provide automation with adjustable accuracy may be implemented in a cloud computing environment. It is understood in advance that although this disclosure may include a description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 1:
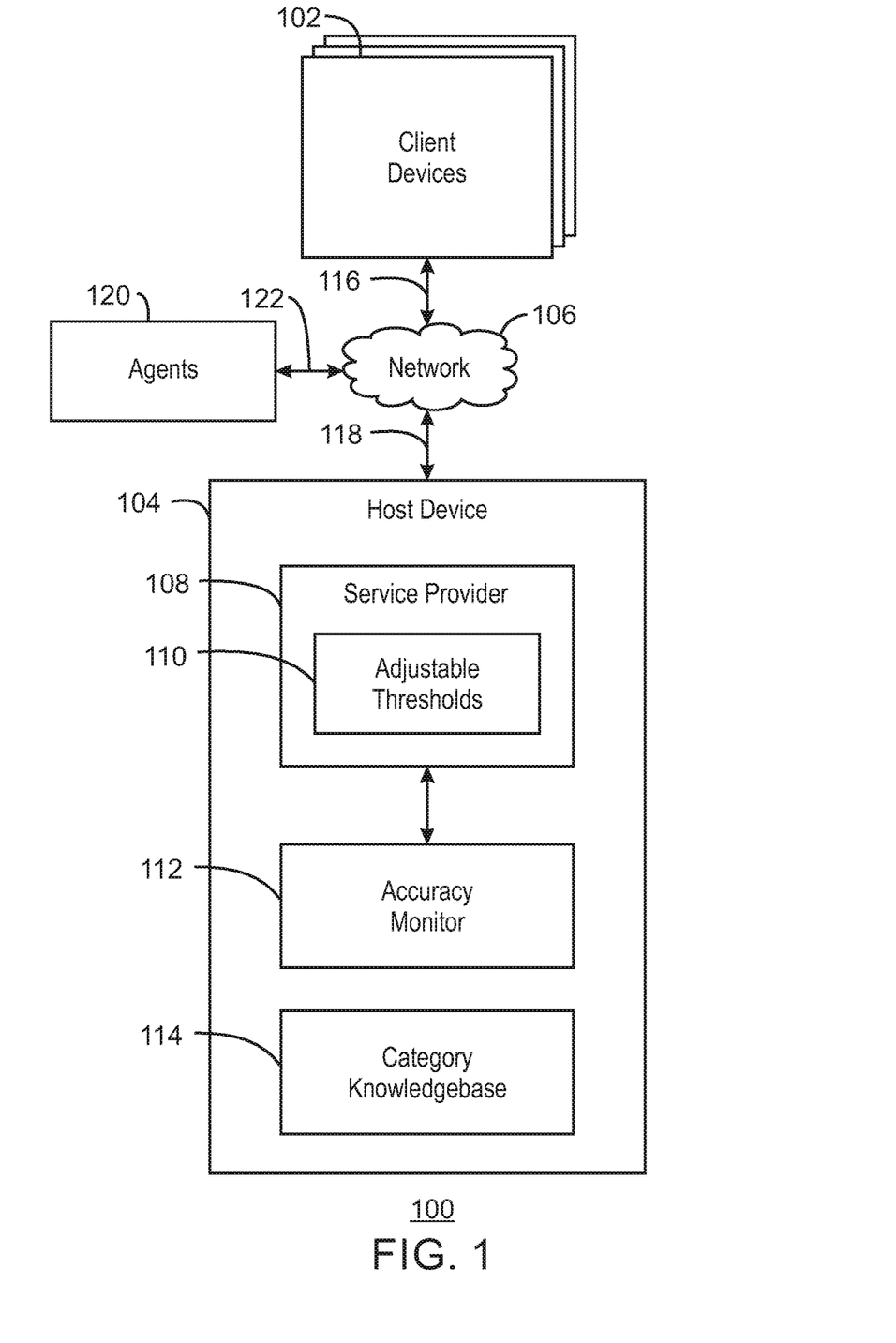
FIG. 1 is a block diagram of an example system for maintaining ongoing adjustable thresholds based on one or more target accuracy levels in accordance with an embodiment of the present invention.

With reference now to FIG. 1, a block diagram shows an example system for maintaining ongoing adjustable thresholds based on one or more target accuracy levels. The example system is generally referred to by the reference number 100. The system 100 of FIG. 1 includes a plurality of client devices 102, a host device 104, and a network 106. The host device 104 includes a service provider 108 including one or more adjustable thresholds 110 for automated service. The host device 104 further includes an accuracy monitor 112 that is communicatively coupled to the service provider 108. For example, the accuracy monitor 112 may be used to train a machine learning component of the service provider 108. The host device 104 also further includes a category knowledgebase 114. The client devices 102 are communicatively coupled to the host device 104 via the network 106 as indicated by arrows 116 and 118. The system 100 further includes one or more agents 120 also communicatively coupled to the host device 104 via the network 106 as indicated by arrows 122 and 118.

In the example of FIG. 1, one or more client devices 102 may sent data to the host device 104 via the network 106 as indicated by arrows 116 and 118. The service provider 108 of the host device 104 may calculate classification scores for one or more categories for the data in order to classify the data based on information from the category knowledgebase 114. For example, the service provider 108 may include a machine learning component that may be dynamically trained using the adjustable thresholds 110. The machine learning component may include a classifier that can classify data, such as images, documents, or other forms of data, into one or more categories. For example, the machine learning component can be trained using the category knowledgebase. In some examples, the category knowledgebase 114 may include a plurality of categories and features associated with each category. In some examples, the service provider 108 may classify data according to a category with a higher calculated classification score. In some examples, the machine learning component of the service provider 108 can also be trained to provide automated replies to received data. For example, if the classification score for the category exceeds a first associated ongoing adjustable threshold 110, then the machine learning component of the service provider 108 may automatically provide a reply to the data based on the category that the data was classified. For example, the first ongoing adjustable threshold may be an ongoing adjustable automation threshold. In some examples, the service provider 108 can provide various sets of answers according to predetermined levels of confidence. In some examples, the level of confidence may be the primary user specification for the target accuracy level. For example, a level of confidence may indicate "if you are X percent sure, perform action Y". For example, each level of confidence may be associated with different system workflows or actions, such as a user decision. For example, in a Customer Service scenario, some inquiries may be tagged by the system with such a high degree of confidence that they are automatically processed by the system. Other inquiries tagged with less certainty may be sent to agent 120 with an automation list of more relevant suggestions to improve efficiency. For example, if the classification for the category associated with the data does not exceed the ongoing adjustable automation threshold, then the data may be forwarded to an agent 120. The agent 120, in response to receiving the data, may send manual feedback to the host device 104. Given a level of confidence and historical data, the service provider 108 can calculate thresholds for each category in a category knowledgebase 114. The service provider 108 can then compute classification scores based on a received document, and then compared to one or more thresholds. For example, the thresholds may include ongoing adjustable automation thresholds and ongoing adjustable suggestion thresholds.

In some examples, the agent 120 may also randomly audit automated replies sent from the host device 104 to the client devices 102. For example, as part of a workflow, an audit trail of automatically processed documents can be set for human review to make sure the service provider 108 works within a target accuracy. The agent 120 may then, in response to receiving a randomly selected set of automated replies for auditing, audit the automated replies to determine an accuracy of each of the automated replies, and send audit feedback to the host device 104. For example, the audit feedback may include a correct category to classify the particular data associated with the automated reply.

Still referring to FIG. 1, the accuracy monitor 112 may monitor received data from client devices 102 and the automated replies sent back to the client devices 102 by the service provider 108. The accuracy monitor 112 may also monitor feedback received from client devices 102. For example, the feedback received may include manual feedback and audit feedback. In some examples, the accuracy monitor 112 can save the automated replies and feedback to a historical performance database. In some examples, the accuracy monitor 112 can rate the performance of the system based on gathered statistics on windows or periods of time. In some examples, the window of time may be based on a predetermined number of recorded actions. The accuracy monitor 112 can calculate an actual accuracy of automation that is based on the actions, suggestion lists, and feedback in the historical performance database for a given period of time. For example, the actual accuracy may be the percentage of total number of correct automated actions out of the total number of automated actions in the period of time. The accuracy monitor 112 can then adjust one or more of the adjustable thresholds 110 based on the actual calculated accuracy for each of the categories. For example, if the accuracy is below the target accuracy, then an ongoing adjustable automation threshold can be raised. If the accuracy is above the target accuracy, then the ongoing adjustable automation threshold can be lowered. Thus, the accuracy of the service provider 108 may still be within the target accuracy, and more replies can be sent automatically. In this way, the accuracy monitor 112 may increase the efficiency of the service provider 108 and reduce the workload of the agent 120 without impacting the target accuracy.

In some examples, as accuracy of the service provider 108 improves over time, more stringent accuracy constraints may begin to be fulfilled and the results of classification will start to be mapped to actions that require a higher level of accuracy. For example, such actions may be related to data that includes personal information. The accuracy monitor 112 can thus continuously monitor a window of historical decisions and update its models accordingly. The accuracy monitor 112 can also check for deterioration of automation accuracy of the service provider 108 over time and take appropriate action. For example, the accuracy monitor 112 can calculate the percentage of audited messages that are correct. In some examples, a corrected audited message may be one in which the feedback matches the suggestion. The accuracy monitor 112 can then adjust one or more ongoing adjustable automation thresholds as discussed above. In some examples, in the case of accuracy level deterioration, the accuracy monitor 112 can also provide hints to the user on additional possible corrective measures.

In some examples, the accuracy monitor 112 can monitor multiple aspects in parallel, including automation and feedback. For example, the accuracy monitor 112 may decide to turn off automated replies while providing an automation list of suggestions to assist agents 120 in providing manual feedback. In some examples, in response to receiving a request from agents 120, the accuracy monitor 112 can also provide a longer list of suggestions than the automation list. Thus, if the automation list of suggestions does not have an appropriate reply, then the suggestion list may be provided for further consideration of additional suggestions.

It is to be understood that the block diagram of FIG. 1 is not intended to indicate that the system 100 is to include all of the components shown in FIG. 1. Rather, the system 100 can include fewer or additional components not illustrated in FIG. 1 (e.g., additional client devices, agents, host devices, etc.).

Figure 2:
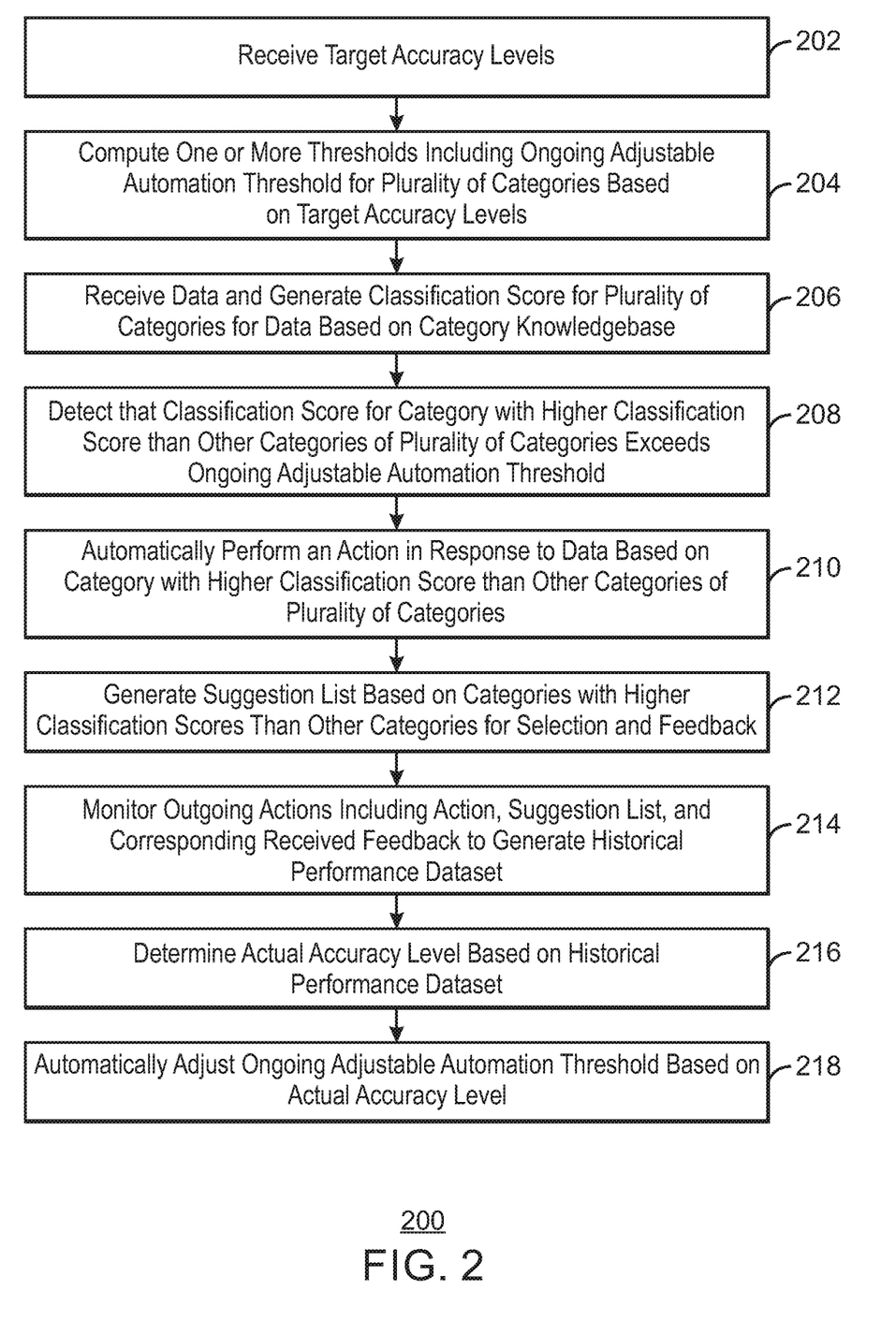
FIG. 2 is a block diagram of an example method for maintaining ongoing adjustable thresholds based on one or more target accuracy levels in accordance with an embodiment of the present invention.

FIG. 2 is a process flow diagram of an example method for maintaining ongoing adjustable thresholds based on one or more target accuracy levels. The method 200 can be implemented with any suitable computing device, such as the computing device 300 of FIG. 3 and is described with reference to the system 100 of FIG. 1. For example, the methods described below can be implemented by the host device 104 of FIG. 1 above or the processor 302 of computing device 300 below.

At block 202, a processor receives target accuracy levels. In some examples, each target accuracy level may correspond to a particular category of data. For example, the target accuracy levels may be a percentage of correct replies of total number of automated replies for each category of data. In some examples, some categories of data may have higher target accuracy levels than other categories of data. As one example, a category of data corresponding to personal information may have a higher target accuracy level than a category of data corresponding to public information. Thus, for example, the target accuracy level for replies to data classified as personal information may be 95%, whereas a target accuracy level for replies to data classified as public information may be 80%. In some examples, the target accuracy level may be a range of acceptable accuracy values. In some examples, the target accuracy level may be received in the form of a level of confidence.

At block 204, the processor computes one or more thresholds including an ongoing adjustable automation threshold for a plurality of categories based on the target accuracy levels. For example, the ongoing adjustable automation threshold may be a threshold classification score that is predicted to result in an accuracy of at least the target accuracy level for a particular data. As one example, based on a target accuracy level of 95% for a particular category, the processor may set the ongoing adjustable automation threshold to a classification score value that is predicted to result in an accuracy of about 95%. In some examples, the ongoing adjustable automation threshold may initially be set very high such that no messages are automated. For example, the system may operate in manual mode and the user may initially see all suggestions. In some examples, the system may operate in a manual mode until the processor calculates that automation is safe based on the feedback the processor receives from one or more agents. For example, if the feedback receives indicates an overall actual accuracy of 95%, then the processor may begin to automate messages. In some examples, one or more suggestion thresholds may also be computed. For example, ongoing adjustable suggestion thresholds may be computed for sending suggestion lists. For example, the suggestion lists may include short lists and long lists depending on which ongoing adjustable suggestion thresholds are exceeded.

At block 206, the processor receives data and generates a classification score for the plurality of categories with respect to the data based on a category knowledgebase. The category knowledgebase may be a database containing statistical models for the plurality of categories. For example, the statistical models may have been calculated based on received manual feedback. For example, the manual feedback may include random audit feedback provided in response to a random audit of automated actions. In some examples, the data may be images, documents, etc. In some examples, the classification score may be generated by a classifier trained using information stored in the category knowledgebase.

At block 208, the processor detects that the classification score for a category with a higher classification than other categories of the plurality of categories exceeds an ongoing adjustable automation threshold. For example, the processor may detect that the category with the highest classification score has a classification score that exceeds the ongoing adjustable automation threshold. In some examples, the processor may also detect that a manual feedback threshold is exceeded. For example, a threshold amount of manual feedback may be detected in the knowledge database before automation is applied at block 210 below. In some examples, the processor can detect that the classifications score exceeds an ongoing adjustable suggestion threshold.

At block 210, the processor automatically performs an action in response to the data based on a category with a higher classification score than other categories of the plurality of categories. For example, the action may be a reply, such as an automated response to a question concerning a category. As one example, an automated reply may direct a user to a particular webpage, phone number or email address for a question concerning a user account. In some examples, other actions may include routing of data, tagging documents, putting documents into folders, attaching stock answers to documents, or executing some process (such as retiring document). In some examples, the processor can automatically perform the action in response to further detecting that the category knowledgebase includes an amount of manual feedback data exceeding a threshold. For example, the processor may perform the action automatically in response to detecting that both the ongoing adjustable automation threshold and manual feedback thresholds are exceeded. In some examples, the processor can send the data and the plurality of categories to an agent in response to detecting that none of the categories exceed the ongoing adjustable automation threshold, and receive the feedback from the agent. For example, the feedback can include manual feedback indicating a classification of data. In some examples, the processor can send the data and the suggestion list including a subset of the plurality of categories with classification scores above a suggestion threshold to an agent in response to detecting that none of the categories exceed the ongoing adjustable automation threshold or in response to detecting that the category knowledgebase includes an amount of manual feedback data less than a threshold, and receive the feedback from the agent. For example, if a personal information has a 95% ongoing adjustable automation threshold, and none of the classified categories exceed that 95% threshold score, then the personal information can be sent to an agent for manual classification of the personal information. In another example, if the category knowledgebase does not have enough manual feedback to classify the personal information beyond a 95% threshold, then the personal information may be sent to an agent for manual classification. In some examples, the processor can send the data and an automation list of the plurality of categories with classification scores above a higher suggestion threshold than the first suggestion threshold to an agent to be displayed in response to detecting that none of the categories exceed the ongoing adjustable automation threshold, and receive the feedback from the agent. For example, an automation list may include a predetermined number of categories, such as ten categories with higher classification scores. In some examples, the processor can send the data and a suggestion list of the plurality of categories with classifications scores above the first suggestion threshold to an agent in response to detecting that none of the categories exceed the ongoing adjustable automation threshold, and receive the feedback from the agent. For example, the suggestion list may include any number of categories with classification scores above the first suggestion threshold. In some examples, the suggestion list may be displayed to the agent in response to a request from the agent. Thus, automated actions may not be performed for categories with higher ongoing adjustable automation thresholds at the beginning, but may be automated as more manual feedback is received in the category knowledgebase and classification scores are improved. Once a classification score exceeds the ongoing adjustable automation threshold for a particular category, then an automated action for that category can be performed in response to a particular received data classified in the category.

At block 212, the processor generates a suggestion list based on categories with higher classification scores than other categories for selection and feedback. For example, the suggestion list may include a list of ten categories with higher classification scores. In some examples, an agent may receive the suggestion list and select one or more categories and provide feedback including the selected category.

At block 214, the processor monitors outgoing actions including the action, the suggestion list, and corresponding received feedback to generate a historical performance dataset. For example, the received feedback may be a category for the data. In some examples, the received feedback may be audit feedback. For example, the audit feedback may be one or more corrected categories to use to classify the data received from a random audit of automatically classified data. For example, the data may have been initially classified as a type of public data, but the received feedback may classify the data as private data, such as some form of personal information. In some examples, the audit feedback may be confirmation of the accuracy of the original automated classification of the data. For example, the audit feedback classification may match the original automated classification. In some examples, the received feedback may be manual feedback. For example, the action may not have been automated, but rather sent to an agent for a manual indication of an appropriate category and corresponding action for the data.

At block 216, the processor determines an actual accuracy level based on the historical performance dataset. For example, the actual accuracy level may be the number of correctly automated replies divided by the number of total automated replies.

At block 218, the processor adjusts the ongoing adjustable automation threshold based on the actual accuracy level. For example, the processor can lower the ongoing adjustable automation threshold in response to detecting that the actual accuracy level is above the target accuracy level. As one example, a user may have set a target automation accuracy level to 90%. While examining the history window, the processor may calculate an actual average accuracy level of 95%. The processor can thus automatically relax the ongoing adjustable automation threshold in one or more models to allow for more data or documents to be automated. In some examples, the processor can raise the ongoing adjustable automation threshold in response to detecting that the actual accuracy level is below the target accuracy level. Thus, the processor can ensure that the target accuracy level is being met while also increasing efficiency by ensuring that as many automated replies are being sent as possible given the target accuracy level.

The process flow diagram of FIG. 2 is not intended to indicate that the operations of the method 200 are to be executed in any particular order, or that all of the operations of the method 200 are to be included in every case. Additionally, the method 200 can include any suitable number of additional operations. For example, instead of block 208, the processor may detect that none of the classification scores for any of the categories exceeds the ongoing adjustable automation threshold. The processor may then send the data to an agent for manual classification and receive manual feedback including a category for the data in response.

Figure 3:
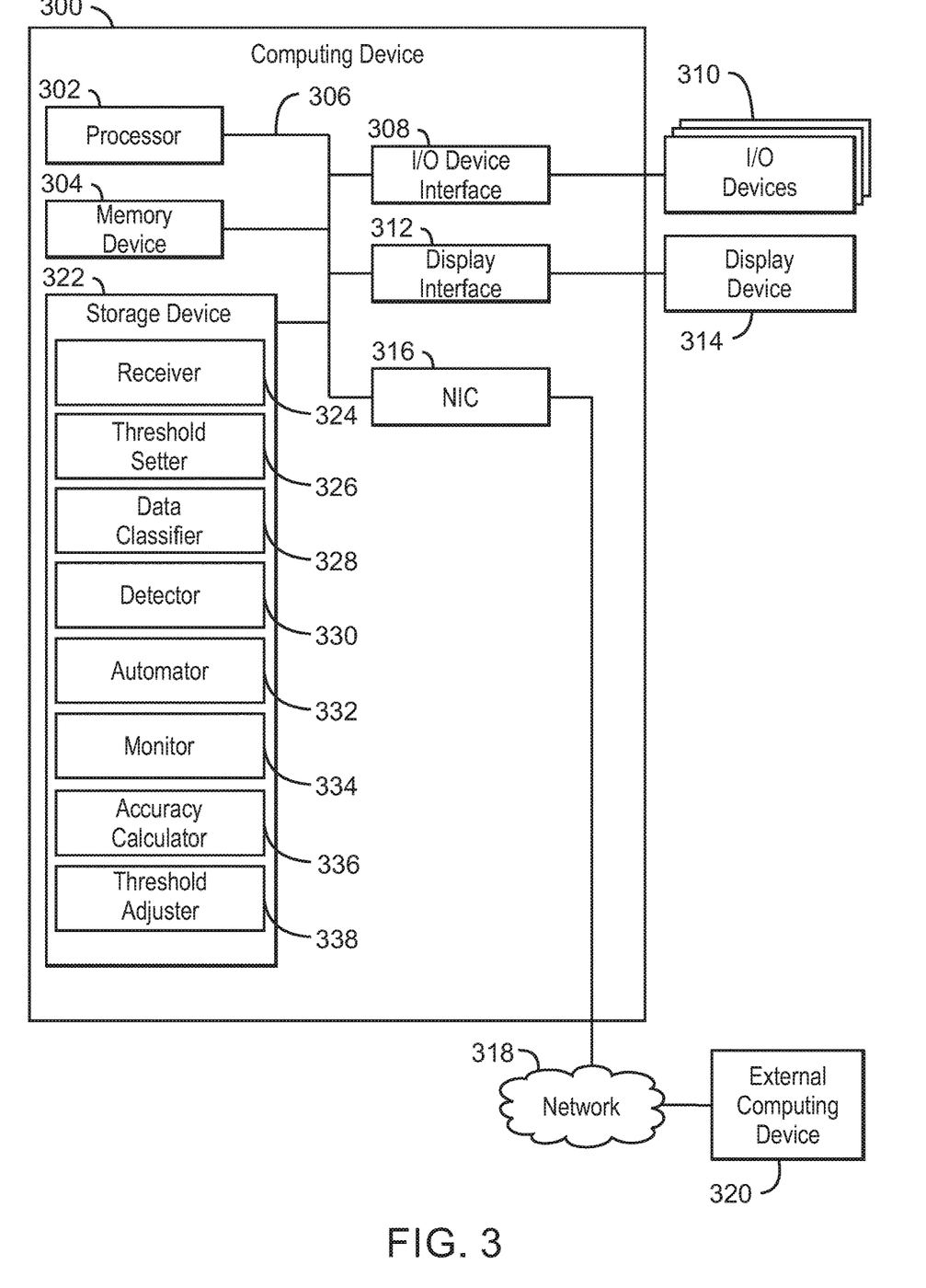
FIG. 3 is a block diagram of an example computing device that can maintain ongoing adjustable thresholds based on one or more target accuracy levels in accordance with an embodiment of the present invention.

FIG. 3 is block diagram of an example computing device that can maintain ongoing adjustable thresholds based on one or more target accuracy levels. The computing device 300 may be for example, a server, desktop computer, laptop computer, tablet computer, or smartphone. In some examples, computing device 300 may be a cloud computing node. Computing device 300 may be described in the general context of computer system executable instructions, such as program modules, being executed by a computer system. Generally, program modules may include routines, programs, objects, components, logic, data structures, and so on that perform particular tasks or implement particular abstract data types. Computing device 300 may be practiced in distributed cloud computing environments where tasks are performed by remote processing devices that are linked through a communications network. In a distributed cloud computing environment, program modules may be located in both local and remote computer system storage media including memory storage devices.

The computing device 300 may include a processor 302 that is to execute stored instructions, a memory device 304 to provide temporary memory space for operations of said instructions during operation. The processor can be a single-core processor, multi-core processor, computing cluster, or any number of other configurations. The memory 304 can include random access memory (RAM), read only memory, flash memory, or any other suitable memory systems.

The processor 302 may be connected through a system interconnect 306 (e.g., PCI®, PCI-Express®, etc.) to an input/output (I/O) device interface 308 adapted to connect the computing device 300 to one or more I/O devices 310. The I/O devices 310 may include, for example, a keyboard and a pointing device, wherein the pointing device may include a touchpad or a touchscreen, among others. The I/O devices 310 may be built-in components of the computing device 300, or may be devices that are externally connected to the computing device 300.

The processor 302 may also be linked through the system interconnect 306 to a display interface 312 adapted to connect the computing device 300 to a display device 314. The display device 314 may include a display screen that is a built-in component of the computing device 300. The display device 314 may also include a computer monitor, television, or projector, among others, that is externally connected to the computing device 300. In addition, a network interface controller (NIC) 316 may be adapted to connect the computing device 300 through the system interconnect 306 to the network 318. In some embodiments, the NIC 316 can transmit data using any suitable interface or protocol, such as the internet small computer system interface, among others. The network 318 may be a cellular network, a radio network, a wide area network (WAN), a local area network (LAN), or the Internet, among others. An external computing device 320 may connect to the computing device 300 through the network 318. In some examples, external computing device 320 may be an external webserver 320. In some examples, external computing device 320 may be a cloud computing node.

The processor 302 may also be linked through the system interconnect 306 to a storage device 322 that can include a hard drive, an optical drive, a USB flash drive, an array of drives, or any combinations thereof. In some examples, the storage device may include a receiver 324, a threshold setter 326, a data classifier 328, a detector 330, an automator 332, a monitor 334, an accuracy calculator 336, and a threshold adjuster 338. The receiver 324 can receive a target accuracy level. In some examples, the target accuracy level may correspond to a particular category of data. For example, some categories of data may have higher target accuracy levels than other categories of data. In some examples, the target accuracy level may be a range of acceptable accuracy values. In some examples, the target accuracy level may be received in the form of a level of confidence. The threshold setter 326 can compute one or more thresholds including an ongoing adjustable automation threshold for a plurality of categories based on the target accuracy level. The data classifier 328 can receive data and generate a classification score for the plurality of categories with respect to the data based on a category knowledgebase. In some examples, the data can include images, documents, etc. The detector 330 can detect that a classification score for a category with a higher classification score than other categories of the plurality of categories exceeds an ongoing adjustable automation threshold. The automator 332 can automatically perform an action in response to the data based on the category with the higher classification score than the other categories of the plurality of categories. In some examples, the automator 332 can send the data and the plurality of categories to an agent in response to detecting that none of the categories exceed the ongoing adjustable automation threshold. The automator 332 can then receive feedback to the data from the agent. For example, the automator 332 can generate a suggestion list based on categories with higher classification scores than other categories for selection and feedback. In some examples, the automator 332 can send the suggestion list to an agent in response to detecting that none of the categories exceed the ongoing adjustable automation threshold, and receive feedback to the data from the agent. The monitor 334 can monitor the action, the suggestion list, and corresponding received feedback to generate a historical performance dataset. In some examples, the received feedback may be audit feedback. For example, the audit feedback may be a corrected category to use to classify the data. For example, the data may have been classified as a type of public data, but the received feedback may classify the data as private data, such as some form of personal information. In some examples, the audit feedback may be confirmation of the accuracy of the original automated classification of the data. In some examples, the received feedback may be manual feedback. For example, the reply may not have been automated, but rather sent to an agent for a manual indication of an appropriate category for the data. The accuracy calculator 336 can determine an actual accuracy level based on the historical performance dataset. For example, the historical performance dataset may include a total number of automated replies and a number of received feedback indicating incorrectly automated replies. The threshold adjuster 338 can automatically adjust the ongoing adjustable automation threshold based on the actual accuracy level. For example, the threshold adjuster 338 can lower the ongoing adjustable automation threshold in response to detecting that the actual accuracy level is above the target accuracy level. In some examples, the threshold adjuster 338 can raise the ongoing adjustable automation threshold in response to detecting that the actual accuracy level is below the target accuracy level.

It is to be understood that the block diagram of FIG. 3 is not intended to indicate that the computing device 300 is to include all of the components shown in FIG. 3. Rather, the computing device 300 can include fewer or additional components not illustrated in FIG. 3 (e.g., additional memory components, embedded controllers, modules, additional network interfaces, etc.). Furthermore, any of the functionalities of the receiver 324, the threshold setter 326, the data classifier 328, the detector 330, the automator 332, the monitor 334, the accuracy calculator 336, and the threshold adjuster 338, may be partially, or entirely, implemented in hardware and/or in the processor 302. For example, the functionality may be implemented with an application specific integrated circuit, logic implemented in an embedded controller, or in logic implemented in the processor 302, among others. In some embodiments, the functionalities of the receiver 324, the threshold setter 326, the data classifier 328, the detector 330, the automator 332, the monitor 334, the accuracy calculator 336, and the threshold adjuster 338, can be implemented with logic, wherein the logic, as referred to herein, can include any suitable hardware (e.g., a processor, among others), software (e.g., an application, among others), firmware, or any suitable combination of hardware, software, and firmware.

Figure 4:
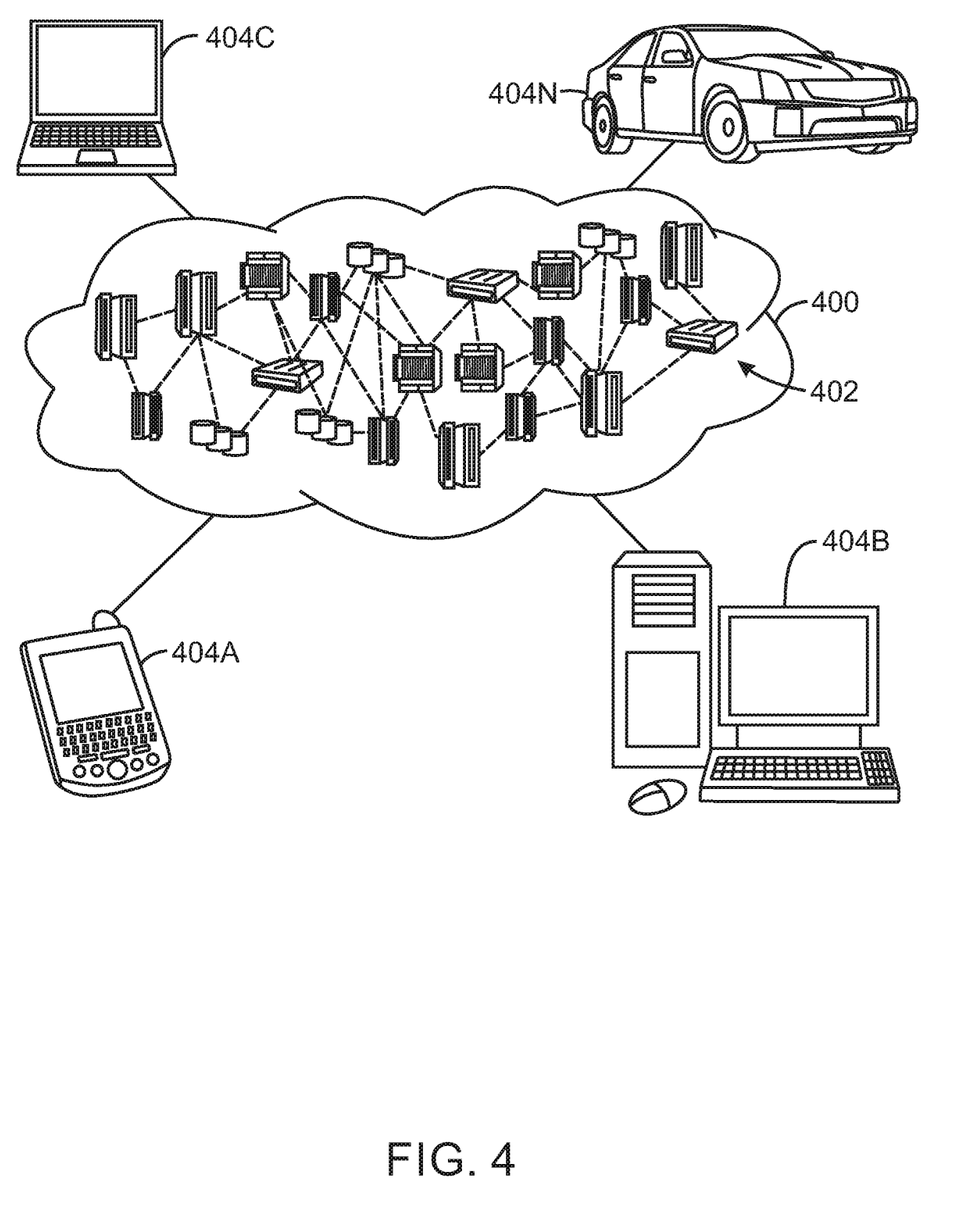
FIG. 4 is a process flow diagram of an example cloud computing environment according to embodiments described herein in accordance with an embodiment of the present invention.

Referring now to FIG. 4, illustrative cloud computing environment 400 is depicted. As shown, cloud computing environment 400 comprises one or more cloud computing nodes 402 with which local computing devices used by cloud consumers, such as, for example, personal digital assistant (PDA) or cellular telephone 404A, desktop computer 404B, laptop computer 404C, and/or automobile computer system 404N may communicate. Nodes 402 may communicate with one another. They may be grouped (not shown) physically or virtually, in one or more networks, such as Private, Community, Public, or Hybrid clouds as described hereinabove, or a combination thereof. This allows cloud computing environment 400 to offer infrastructure, platforms and/or software as services for which a cloud consumer does not need to maintain resources on a local computing device. It is understood that the types of computing devices 404A-N shown in FIG. 4 are intended to be illustrative only and that computing nodes 402 and cloud computing environment 400 can communicate with any type of computerized device over any type of network and/or network addressable connection (e.g., using a web browser).

Figure 5:
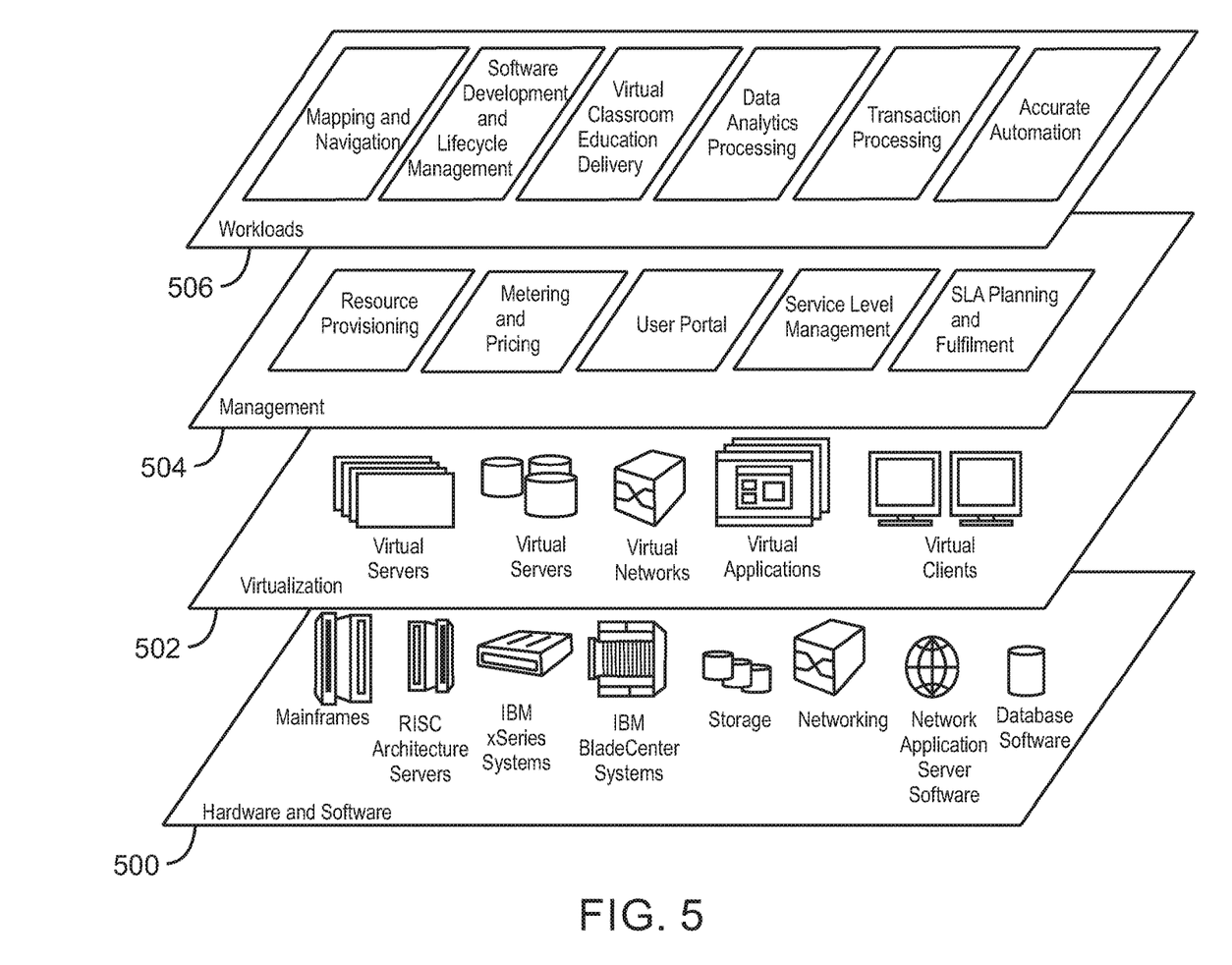
FIG. 5 is a process flow diagram of example abstraction model layers according to embodiments described herein in accordance with an embodiment of the present invention.

Referring now to FIG. 5, a set of functional abstraction layers provided by cloud computing environment 400 (FIG. 4) is shown. It should be understood in advance that the components, layers, and functions shown in FIG. 5 are intended to be illustrative only and embodiments of the invention are not limited thereto. As depicted, the following layers and corresponding functions are provided.

Hardware and software layer 500 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM Web Sphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 502 provides an abstraction layer from which the following examples of virtual entities may be provided: virtual servers; virtual storage; virtual networks, including virtual private networks; virtual applications and operating systems; and virtual clients. In one example, management layer 504 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 506 provides examples of functionality for which the cloud computing environment may be utilized. Examples of workloads and functions which may be provided from this layer include: mapping and navigation; software development and lifecycle management; virtual classroom education delivery; data analytics processing; transaction processing; and accurate automation.

The present techniques may be a system, a method or computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present techniques may be assembler instructions, instruction-set-architecture (ISA) instructions, machine instructions, machine dependent instructions, microcode, firmware instructions, state-setting data, or either code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present techniques.

Aspects of the present techniques are described herein with reference to flowchart illustrations and/or block diagrams of methods, apparatus (systems), and computer program products according to embodiments of the techniques. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Figure 6:
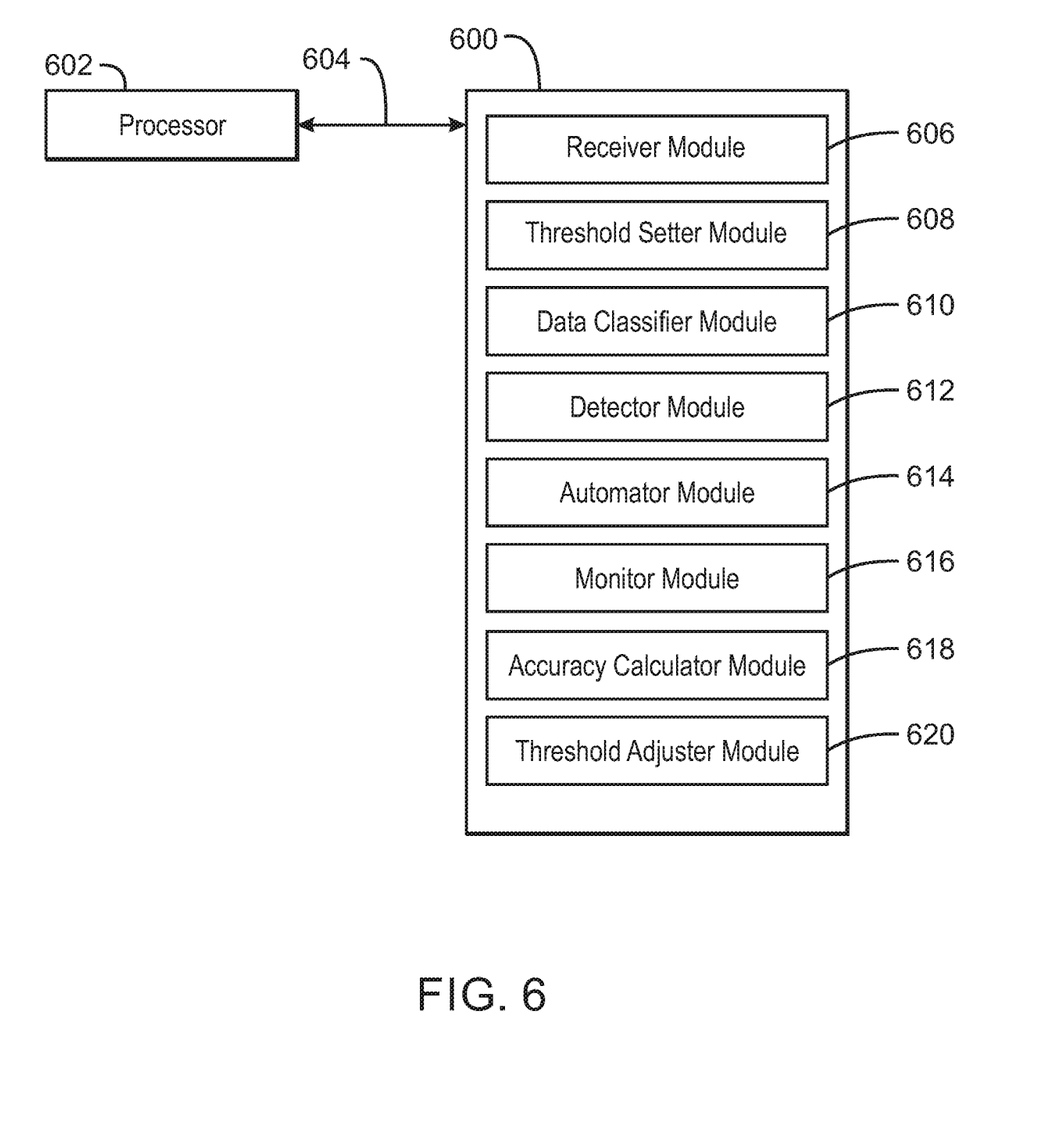
FIG. 6 is an example tangible, non-transitory computer-readable medium that can maintain ongoing adjustable thresholds based on one or more target accuracy levels in accordance with an embodiment of the present invention.

Referring now to FIG. 6, a block diagram is depicted of an example tangible, non-transitory computer-readable medium 600 that can maintain ongoing adjustable thresholds based on one or more target accuracy levels. The tangible, non-transitory, computer-readable medium 600 may be accessed by a processor 602 over a computer interconnect 604. Furthermore, the tangible, non-transitory, computer-readable medium 600 may include code to direct the processor 602 to perform the operations of the method 200 of FIG. 2 above.

The various software components discussed herein may be stored on the tangible, non-transitory, computer-readable medium 600, as indicated in FIG. 6. For example, a receiver module 606 includes code to receive a target accuracy level. In some examples, the target accuracy level may be received in the form of a level of confidence. A threshold setter module 608 includes code to compute one or more thresholds including an ongoing adjustable automation threshold for a plurality of categories based on the target accuracy level. A data classifier module 610 includes code to receive data and generate a classification score for the plurality of categories with respect to the data based on a category knowledgebase. A detector module 612 includes code to detect that a classification score for a category with a higher classification score than other categories of the plurality of categories exceeds an ongoing adjustable automation threshold. An automator module 612 includes code to automatically perform an action in response to the data based on the category with the higher classification score than the other categories of the plurality of categories. In some examples, the automator module 612 can include code to automatically perform an action in response to detecting that the category knowledgebase includes an amount of manual feedback data exceeding a threshold. In some examples, the automator module 612 can generate a suggestion list based on categories with higher classification scores than other categories for selection and feedback. For example, the suggestion list may include categories with classification scores above a first suggestion threshold. In some examples, the automator module 612 can include code to send the data and the plurality of categories to an agent in response to detecting that none of the categories exceed the ongoing adjustable automation threshold. In some examples, the automator module 612 can include code to send the data and an automation list including a subset of the plurality of categories with classifications scores above a the first suggestion threshold to an agent in response to detecting that none of the categories exceed the ongoing adjustable automation threshold or in response to detecting that the category knowledgebase includes an amount of manual feedback data less than a threshold. In some examples, the automator module 612 can include code to send the data and an automation list of the plurality of categories with classifications scores above a higher suggestion threshold than the first suggestion threshold to an agent to be displayed in response to detecting that none of the categories exceed the ongoing adjustable automation threshold. A monitor module 614 includes code to monitor the action, the suggestion list, and corresponding received feedback to generate a historical performance dataset. An accuracy calculator module 616 includes code to determine an actual accuracy level based on the historical performance dataset. A threshold adjuster module 618 includes code to adjust the ongoing adjustable automation threshold based on the determined actual accuracy level. For example, the threshold adjuster module 618 can include code to lower the ongoing adjustable automation threshold in response to detecting that the actual accuracy level is above the target accuracy level. The threshold adjuster module 618 can also include code to raise the ongoing adjustable automation threshold in response to detecting that the actual accuracy level is below the target accuracy level. It is to be understood that any number of additional software components not shown in FIG. 6 may be included within the tangible, non-transitory, computer-readable medium 600, depending on the particular application.

The flowchart and block diagrams in the Figures illustrate the architecture, functionality, and operation of possible implementations of systems, methods, and computer program products according to various embodiments of the present techniques. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. It is to be understood that any number of additional software components not shown in FIG. 6 may be included within the tangible, non-transitory, computer-readable medium 600, depending on the specific application.

The descriptions of the various embodiments of the present techniques have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A system, comprising:
a memory unit for storing a computer program for maintaining a target accuracy level; and
a processor coupled to the memory unit, wherein the processor is configured to execute the program instructions of the computer program comprising:
receiving the target accuracy level;
computing one or more thresholds comprising an ongoing adjustable automation threshold for a plurality of categories based on the target accuracy level;

receiving data and generating a classification score for the plurality of categories with respect to the data based on a category knowledgebase;

detecting that a classification score for a category with a higher classification score than other categories of the plurality of categories exceeds the ongoing adjustable automation threshold;

automatically performing an action in response to the data based on a category with the higher classification score than the other categories of the plurality of categories;

generating a suggestion list based on categories with higher classification scores than other categories for selection and feedback;

monitoring the action, the suggestion list, and corresponding received feedback to generate a historical performance dataset;

determining an actual accuracy level based on the historical performance dataset; and automatically adjusting the ongoing adjustable automation threshold based on the actual accuracy level.

2. The system of claim 1, wherein the target accuracy level comprises a range of accuracy values.

3. The system of claim 1, wherein the program instructions of the computer program further comprise:

sending the data and the plurality of categories to an agent in response to detecting that none of the categories exceed the ongoing adjustable automation threshold, and receiving the feedback from the agent.

4. The system of claim 1, wherein the program instructions of the computer program further comprise:

sending the data and the suggestion list to an agent in response to detecting that one or more of the categories exceed a suggestion threshold, and receiving the feedback from the agent.

5. The system of claim 1, wherein adjusting the ongoing adjustable automation threshold comprises lowering the ongoing adjustable automation threshold in response to detecting that the actual accuracy level is above the target accuracy level or raising the ongoing adjustable automation threshold in response to detecting that the actual accuracy level is below the target accuracy level.

6. The system of claim 1, wherein the received feedback comprises manual feedback.

7. The system of claim 6, wherein the manual feedback comprises audit feedback.

8. A computer-implemented method for maintaining a target accuracy level, comprising:

receiving the target accuracy level;

computing one or more thresholds comprising an ongoing adjustable automation threshold for a plurality of categories based on the target accuracy level;

receiving data and generating a classification score for the plurality of categories with respect to the data based on a category knowledgebase;

detecting that a classification score for a category with a higher classification score than other categories of the plurality of categories exceeds the ongoing adjustable automation threshold;

automatically performing an action in response to the data based on the category with a higher classification score than the other categories of the plurality of categories;

generating a suggestion list based on categories with higher classification scores than other categories for selection and feedback;

monitoring outgoing actions including the action, the suggestion list, and corresponding received feedback to generate a historical performance dataset;

determining an actual accuracy level based on the historical performance dataset; and adjusting, by a processor, the ongoing adjustable automation threshold based on the actual accuracy level.

9. The computer-implemented method of claim 8, wherein automatically performing the action is performed in response to detecting that the category knowledgebase comprises an amount of manual feedback data exceeding a threshold.

10. The computer-implemented method of claim 8 further comprising:

sending the data and the plurality of categories to an agent in response to detecting that none of the categories exceed the ongoing adjustable automation threshold, and receiving a reply from the agent.

11. The computer-implemented method of claim 8 further comprising:

sending the data and the suggestion list with classifications scores above a suggestion threshold to an agent in response to detecting that none of the categories exceed the ongoing adjustable automation threshold or in response to detecting that the category knowledgebase comprises an amount of manual feedback data less than a threshold, and receiving the feedback from the agent.

12. The computer-implemented method of claim 8 further comprising:

sending the data and an automation list comprising a predetermined number of the plurality of categories with classifications scores above a higher suggestion threshold than a first suggestion threshold to an agent to be displayed in response to detecting that none of the categories exceed the ongoing adjustable automation threshold, and receiving the feedback from the agent.

13. The computer-implemented method of claim 8 further comprising:

sending the data and the suggestion list comprising the plurality of categories with classifications scores above a suggestion threshold to an agent in response to detecting that none of the categories exceed the ongoing adjustable automation threshold, and receiving a reply from the agent, wherein the suggestion list is to be displayed to the agent in response to a request from the agent.

14. The computer-implemented method of claim 8, wherein the received feedback comprises a category for the data.

15. A computer program product for maintaining a target accuracy level, the computer program product comprising a computer-readable storage medium having program code embodied therewith, the program code executable by a processor to cause the processor to:

receive the target accuracy level;

compute one or more thresholds comprising an ongoing adjustable automation threshold for a plurality of categories based on the target accuracy level;

receive data and generate a classification score for the plurality of categories with respect to the data based on a category knowledgebase;

detect that a classification score for a category with a higher classification score than other categories of the plurality of categories exceeds the ongoing adjustable automation threshold;

automatically perform an action in response to the data based on a category with the higher classification score than the other categories of the plurality of categories;

generate a suggestion list based on categories with higher classification scores than other categories for selection and feedback;

monitor the action, the suggestion list, and corresponding received feedback to generate a historical performance dataset;

determine an actual accuracy level based on the historical performance dataset; and lower the ongoing adjustable automation threshold in response to detecting that the actual accuracy level is above the target accuracy level.

16. The computer program product of claim 15, further comprising program code executable by the processor to raise the ongoing adjustable automation threshold in response to detecting that the actual accuracy level is below the target accuracy level.

17. The computer program product of claim 15, further comprising program code executable by the processor to automatically perform the action in response to detecting that the category knowledgebase comprises an amount of manual feedback data exceeding a threshold.

18. The computer program product of claim 15, further comprising program code executable by the processor to send the data and the plurality of categories to an agent in response to detecting that none of the categories exceed the ongoing adjustable automation threshold.

19. The computer program product of claim 15, further comprising program code executable by the processor to send the data and a suggestion list comprising a subset of the plurality of categories with classifications scores above a suggestion threshold to an agent in response to detecting that none of the categories exceed the ongoing adjustable automation threshold or in response to detecting that the category knowledgebase comprises an amount of manual feedback data less than a threshold.

20. The computer program product of claim 15, further comprising program code executable by the processor to send the data and an automation list of the plurality of categories with classifications scores above a higher suggestion threshold than a first suggestion threshold to an agent to be displayed in response to detecting that none of the categories exceed the ongoing adjustable automation threshold.

\* \* \* \* \*